US010629227B2

(12) United States Patent
Ready et al.

(10) Patent No.: US 10,629,227 B2
(45) Date of Patent: Apr. 21, 2020

(54) METHODS AND COATINGS FOR ADVANCED AUDIO RECORDING AND PLAYBACK

(71) Applicants: Georgia Tech Research Corporation, Atlanta, GA (US); Olympic Studio LLC, Los Angeles, CA (US)

(72) Inventors: William Jud Ready, Atlanta, GA (US); Brent Karl Wagner, Atlanta, GA (US); Joseph Henry Burnett, Los Angeles, CA (US); Barak Moffitt, Los Angeles, CA (US)

(73) Assignees: Georgia Tech Research Corporation, Atlanta, GA (US); Olympic Studio LLC, Los Angeles, CA (US)

( * ) Notice: Subject to any disclaimer, the term of this patent is extended or adjusted under 35 U.S.C. 154(b) by 0 days.

(21) Appl. No.: 15/752,170

(22) PCT Filed: Aug. 12, 2016

(86) PCT No.: PCT/US2016/046869
§ 371 (c)(1),
(2) Date: Feb. 12, 2018

(87) PCT Pub. No.: WO2017/027832
PCT Pub. Date: Feb. 16, 2017

(65) Prior Publication Data
US 2018/0240474 A1 Aug. 23, 2018

Related U.S. Application Data

(60) Provisional application No. 62/203,995, filed on Aug. 12, 2015, provisional application No. 62/204,044, (Continued)

(51) Int. Cl.
*G11B 3/70* (2006.01)
*G11B 3/68* (2006.01)
(Continued)

(52) U.S. Cl.
CPC ................ *G11B 3/682* (2013.01); *B32B 3/30* (2013.01); *B32B 27/30* (2013.01); *G11B 3/70* (2013.01); *G11B 3/72* (2013.01); *G11B 2220/20* (2013.01)

(58) Field of Classification Search
None
See application file for complete search history.

(56) References Cited

U.S. PATENT DOCUMENTS 1,247,232 A * 11/1917 Delany .................. A45D 33/34
29/DIG. 62
3,668,404 A * 6/1972 Lehovec ............ G02B 26/0875
250/214.1
(Continued)

FOREIGN PATENT DOCUMENTS

DE 2639222 A1 3/1978

OTHER PUBLICATIONS

Partial Supplementary European Search Report dated Mar. 6, 2019 in European Patent Application 16835996.6.
(Continued)

*Primary Examiner* — William J Klimowicz
(74) *Attorney, Agent, or Firm* — Joan T. Kluger; Barnes & Thornburg LLP

(57) ABSTRACT

An embodiment of the invention provides a phonorecord for embodying an audio recording. The phonorecord can comprise a substrate and a conformal coating disposed on at least a portion of the substrate. The substrate can comprise one or more grooves embodying the audio recording.

7 Claims, 16 Drawing Sheets

Related U.S. Application Data filed on Aug. 12, 2015, provisional application No. 62/210,712, filed on Aug. 27, 2015, provisional application No. 62/210,675, filed on Aug. 27, 2015.

(51) Int. Cl.
    *B32B 3/30*     (2006.01)
    *B32B 27/30*     (2006.01)
    *G11B 3/72*     (2006.01)

(56) References Cited

U.S. PATENT DOCUMENTS

| | | | |
|---|---|---|---|
| 3,842,217 A | | 10/1974 | Clemens |
| 4,168,330 A | | 9/1979 | Kaganowicz |
| 4,190,503 A | * | 2/1980 | Ikeda ................ B29C 33/3842 106/1.27 |
| 4,363,844 A | | 12/1982 | Lewis |
| 5,112,025 A | * | 5/1992 | Nakayama .............. B29C 33/56 249/114.1 |
| 6,071,597 A | | 6/2000 | Yang et al. |
| 2014/0127534 A1 | | 5/2014 | Winarski |

OTHER PUBLICATIONS

International Search Report and Written Opinion dated Oct. 21, 2016 in International Application PCT/US2016/046869.
Extended Supplementary European Search Report dated Jul. 2, 2019 in European Patent Application 16835996.6.

\* cited by examiner

METHODS AND COATINGS FOR ADVANCED AUDIO RECORDING AND PLAYBACK

CROSS-REFERENCE TO RELATED APPLICATIONS

This application is a U.S. National Stage of International Patent Application No. PCT/US2016/046869 filed 12 Aug. 2016, which claims the benefit of and priority to U.S. Provisional Patent Application Ser. No. 62/203,995, filed 12 Aug. 2015, U.S. Provisional Patent Application Ser. No. 62/204,044, filed 12 Aug. 2015, U.S. Provisional Patent Application Ser. No. 62/210,712, filed 27 Aug. 2015, and U.S. Provisional Patent Application Ser. No. 62/210,675, filed 27 Aug. 2015, the contents of each of which are fully incorporated herein by reference.

TECHNICAL FIELD

The various embodiments of the disclosure relate generally to materials and methods of improving the durability and sound and data reproduction quality of phonorecords.

BACKGROUND

The process of generating analog audio recordings on cylinders or disks has been known since the start of the 20$^{th}$ century. Over this history, different materials for storing these recordings have come and gone; however, vinyl has remained a standard format since its introduction in the 1930s. Sales of vinyl records reached a peak in the US in the 1970s to early 1980s, but recently the format has seen resurgence in popularity.

The vinyl disk format was originally developed because of its capacity for mass production using a stamping process. The process begins with an audio recording. The audio recording is transcribed using a lathe to cut a groove in a soft material such as acetate or nitrocellulose. This transcribed audio is the closest to the original, and is termed the master cut or master lacquer. The process of producing the consumer vinyl record involves several additional steps, or "generations." The master lacquer is first coated, generally with a layer of silver, and electroplated, using a metal such as nickel, to make a metal master. The metal master, or "father", is a negative of the original master lacquer. The father plate is too fragile to undergo the stamping process, therefore additional steps, or generations, must be performed in order to form a stamper that can withstand the stamping process to form the vinyl records. Accordingly, the father plate is then oxidized and plated again. The resulting plate, the "mother", is then separated from the father. The mother plate is a metal duplicate of the original master lacquer. The mother plate is then oxidized and plated to make stamper plates, which are negatives of the original master lacquer. The stamper plates are then used to imprint the recording onto heated vinyl blanks. Generally, one father plate can produce about 10 mother plates, one mother plate can produce about 10 stampers, and one stamper can produce about 1000 vinyl records. Thus, from production of the master, there are several additional steps, or "generations", required to yield a final product. Production or manufacturing defects arising during these extra generations yield diminished quality further removing the vinyl products from the original audio recording.

SUMMARY OF THE INVENTION

Various embodiments of the disclosure relate generally to materials and methods of improving the durability and sound and data reproduction quality of phonorecords. An embodiment can be a phonorecord for embodying an audio recording comprising a metal substrate, a lacquer coating disposed on at least a portion of the metal substrate, the lacquer coating can comprise one or more grooves embodying the audio recording; and a conformal coating An embodiment can be a method for producing a phonorecord for embodying an audio recording comprising providing a metal substrate, disposing a lacquer coating onto at least a portion of the metal substrate; introducing one or more grooves into the lacquer coating, the one or more grooves can embody the audio recording; and disposing a conformal coating onto at least a portion of the lacquer coating.

The lacquer coating can comprise a nitrocellulose lacquer. In an embodiment, the conformal coating can be made from a material comprising one or more of quartz ($SiO_2$), sapphire ($Al_2O_3$), or diamond-like carbon (DLC). In an embodiment, the material can be quartz ($SiO_2$). In an embodiment, the material can be sapphire ($Al_2O_3$). In an embodiment, the material can be diamond-like carbon.

In an embodiment, the Mohs Hardness of the conformal coating can be greater than the Mohs Hardness of the lacquer coating. In an embodiment, the conformal coating can have a Mohs Hardness of at least about 7. In an embodiment the Vickers Hardness of the conformal coating can be greater than the Vickers Hardness of the lacquer coating. In an embodiment, the conformal coating can have a Vickers Hardness of at least about 1000.

In an embodiment, the thickness of the conformal coating can be from about 10 nm to about 500 nm. In an embodiment, the thickness of the conformal coating can be from about 10 to about 200 nm. In an embodiment, the thickness of the conformal coating can be from about 100 nm to about 150 nm. In an embodiment, the metal substrate can comprise aluminum.

In an embodiment, the phonorecord can comprise a conductive layer disposed onto at least a portion of the conformal coating; the conductive layer can be configured to shed dust from an outer surface of the phonorecord. In an embodiment, the conductive layer can comprise a carbon-based material selected from the group consisting of carbon nanotubes, graphene, and graphite.

In an embodiment, the one or more grooves can form a lacquer coating topography. The conformal coating can have a conformal coating topography that can be substantially identical to the lacquer coating topography.

In an embodiment, the phonorecord can further comprise an optical layer disposed onto at least a portion of the lacquer coating, the optical layer can store digital data.

In an embodiment, the phonorecord can further comprise an optical layer disposed onto at least a portion of the lacquer coating, the optical layer can store digital data.

In an embodiment, disposing the conformal coating can comprise performing one or more of ion assisted deposition, electron beam evaporation, sputtering, thermal evaporation, chemical vapor deposition and physical vapor deposition. In an embodiment, disposing the conformal coating can comprise performing ion assisted deposition. In an embodiment, disposing the conformal coating can comprise performing ion assisted deposition. In an embodiment, disposing the conformal coating can comprise performing atomic layer deposition.

In an embodiment, disposing the conformal can be performed at a temperature of less than about 100° C.

An embodiment can be a phonorecord for embodying an audio recording comprising a vinyl substrate, the vinyl substrate can comprise one or more grooves embodying the audio recording; and a conformal coating disposed on at least a portion of the vinyl substrate, the conformal coating can have a Vickers Hardness of at least about 1000.

In an embodiment, the one or more grooves can form a vinyl substrate topography. In an embodiment, the conformal coating has a conformal coating topography that can be substantially identical to the vinyl substrate topography.

In an embodiment, the phonorecord can further comprise an optical layer disposed onto at least a portion of the vinyl substrate, the optical layer can store digital data.

An embodiment can be a phonorecord for embodying a negative of an audio recording that can comprise a metal substrate, the metal substrate can comprise one or more ridges embodying the negative of the audio recording; and a conformal coating disposed on at least a portion of the substrate, the conformal coating can have a Vickers Hardness of at least about 1000.

In an embodiment, the conformal coating can be configured to provide increased durability to the metal substrate such that the phonorecord is capable of withstanding a plurality of stamps into a vinyl blank. In an embodiment, the phonorecord can be configured to withstand a vinyl stamping process.

An embodiment can be a stylus for playing back an audio recording embodied on a phonorecord that can comprise a carbon-based substrate and a conformal coating disposed onto at least a portion of the carbon-based substrate, the conformal coating can have a Vickers Hardness of at least about 1000. The stylus can be shaped to interface with one or more grooves of the phonorecord. In an embodiment, the carbon-based substrate can be selected from the group consisting of carbon nanotubes, graphene, and graphite.

BRIEF DESCRIPTION OF THE DRAWINGS

FIG. 1a displays a 100 µm scale zoom and FIG. 1b displays a 500 µm scale zoom.

FIG. 2 displays a 20.0 µm scale zoom.

FIG. 3 displays a 500 µm scale zoom.

FIG. 4 displays a 200 µm scale zoom.

FIG. 5 displays a 500 µm scale zoom.

FIG. 5 displays a 100 µm scale zoom.

FIG. 7 displays a 200 µm scale zoom.

FIG. 8 displays a 20.0 µm scale zoom.

FIG. 9 displays a 50.0 µm scale zoom.

FIG. 11a illustrates a conformal coating on a master lacquer, FIG. 11b illustrates a conformal coating on a "father" negative plate and FIG. 11c illustrates the conformal coating on a consumer vinyl record, all accordance with an embodiment of the invention.

DETAILED DESCRIPTION

Figure 1A:
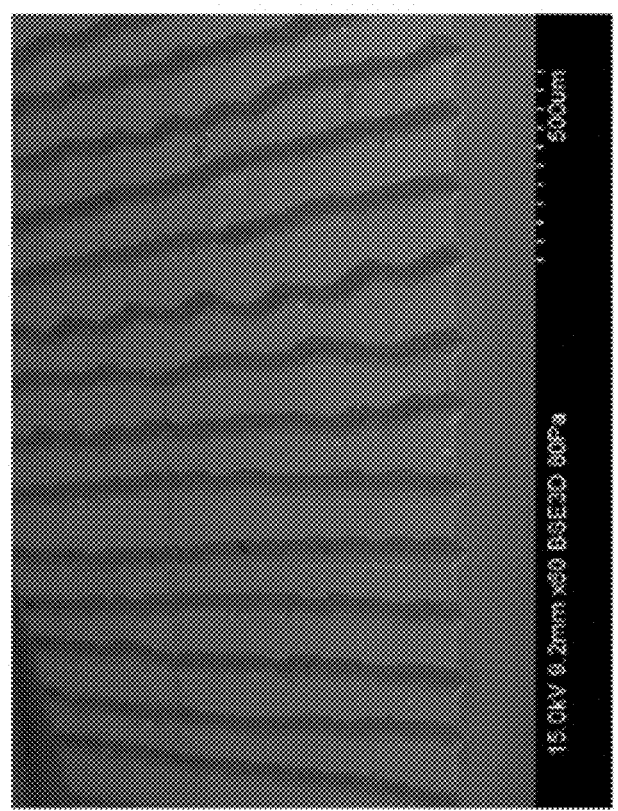
FIG. 1a and FIG. 1b illustrate SEM images of a nitrocellulose lacquer phonorecord after deposition of a 150 nm quartz ($SiO_2$) coating, in accordance with an embodiment of the invention.
Figure 1B:
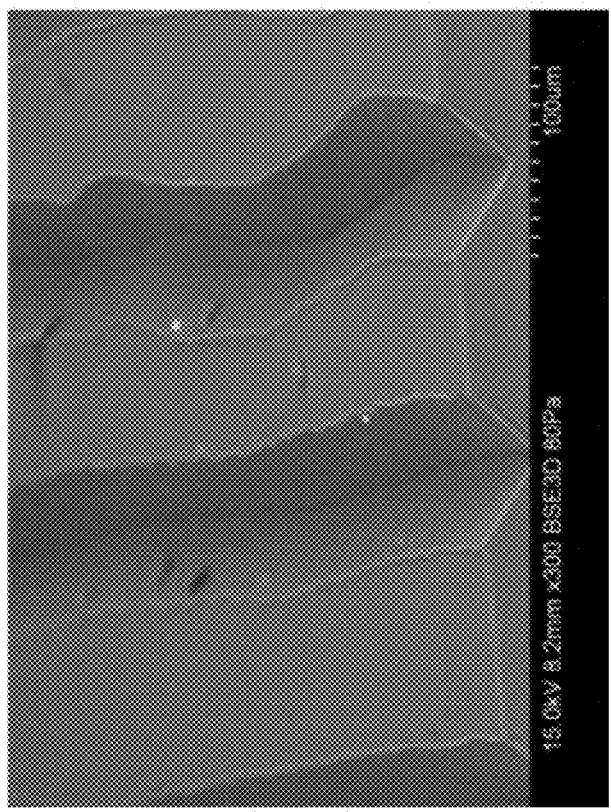

Although many embodiments of the disclosure are explained in detail, it is to be understood that other embodiments are contemplated. Accordingly, it is not intended that the disclosure is limited in its scope to the details of construction and arrangement of components set forth in the following description or illustrated in the drawings. The disclosure is capable of other embodiments and of being practiced or carried out in various ways.

It must also be noted that, as used in the specification and the appended claims, the singular forms "a," "an" and "the" include plural referents unless the context clearly dictates otherwise.

Also, in describing the embodiments, terminology will be resorted to for the sake of clarity. It is intended that each term contemplates its broadest meaning as understood by those skilled in the art and includes all technical equivalents which operate in a similar manner to accomplish a similar purpose.

Ranges may be expressed herein as from "about" or "approximately" one particular value and/or to "about" or "approximately" another particular value. When such a range is expressed, another embodiment includes from the one particular value and/or to the other particular value.

By "comprising" or "comprising" or "including" is meant that at least the named compound, element, particle, or method step is present in the composition or article or method, but does not exclude the presence of other compounds, materials, particles, method steps, even if the other such compounds, material, particles, method steps have the same function as what is named.

It is also to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Various embodiments of the disclosure are directed to the materials and methods for improving durability and sound and data reproduction quality of phonorecords, including, but not limited to, vinyl disc recording technologies. One particular advantage of this disclosure is to remove the number of "generations" required between the creation of an original lathe-cut lacquer master disc and replication into the ultimate end-use consumer product. Decreasing the number of generations between the lacquer master and the consumer product can increase the sound reproduction quality of the audio recording. For example, the lacquer material of master lacquers is generally made from a soft and easily damaged material that is incapable of withstanding multiple playbacks on an audio playback device, such as a turntable. Additionally, consumer vinyl records are often associated with distortion, pops, clicks, and surface noise inherent to the format because of the physical properties of the vinyl. Vinyl is a good insulator and will hold a static charge such that dust and other particles accumulate on the surface. Vinyl records also have a finite playability. Vinyl is not an especially hard material, and its surface can be easily scratched, which over time causes sound fidelity to diminish. Consumer vinyl records can be subject to degradation and damage from repeated playback on an audio playback device, such as a turntable. Various embodiments of the disclosure can produce superior sound reproduction, incorporate digital data, increase foreign particle resistance and shedding, increase longevity and durability, and increase abrasion resistance of master phonorecords and end-use consumer phonorecords.

An embodiment of the invention can be a phonorecord for embodying an audio recording. An audio recording can be any sound created by nature or computer actions, including, but not limited to manual instruments (e.g., guitars, pianos and the like), human speech, sounds of nature, computer-generated sound, and computer generated data representative of certain sounds. In an embodiment, the phonorecord can comprise an audio recording. In an embodiment, the phonorecord can comprise analog data, e.g., analog acoustic data. In another embodiment, the phonorecord can comprise digital data. The digital data can comprise data embodying audio, video, images, text, advertisements, voice comments from an artist, bonus material, e.g., B-side tracks, and the like. In an embodiment, the phonorecord can comprise both digital data and analog data. In an embodiment, the phonorecord can be a master cut or master lacquer. In an embodiment, the phonorecord can be an end-user consumer record. In an embodiment, the phonorecord can be a "father" plate that can be configured to withstand the stamping process so as to eliminate steps, or generations, between the master lacquer and the end-use consumer vinyl phonorecord.

In an embodiment, the phonorecord can be an end-use consumer phonorecord for embodying an audio recording can comprise a vinyl substrate. The vinyl substrate can comprise one or more grooves embodying an audio recording. The vinyl substrate can comprise polyvinyl chloride (PVC). The PVC can be doped with an additional material, including, but not limited to lead, $TiO_2$, $Co^+$, and the like. The PVC can also include an agent, such as a dye, for imparting color into the material. In an embodiment, a conformal coating can be disposed into at least a portion of the vinyl substrate.

In an embodiment, the phonorecord can be a master cut or a master lacquer phonorecord for embodying an audio recording. In an embodiment, the phonorecord can comprise a substrate, a lacquer coating disposed on at least a portion of the substrate, and a conformal coating disposed on at least a portion of the lacquer coating. The substrate can be a metal substrate. The metal substrate can comprise or consist of many different metals known in the art, including, but not limited to, aluminum, magnesium, titanium, copper, iron and alloys thereof, e.g., steel. In an embodiment, the substrate can comprise aluminum. In an embodiment, the substrate can comprise an aluminum alloy. In an embodiment, the substrate can consist of aluminum. In an embodiment, the substrate can consist of an aluminum alloy.

In an embodiment, the phonorecord can be a "father" plate that can be configured to withstand a vinyl stamping process so as to eliminate steps, or generations, between the master lacquer formation and the end-use consumer vinyl phonorecord. The "father" plate phonorecord can be a negative of an original master lacquer so that it can be used as a stamper to imprint vinyl blanks. In an embodiment, the "father" phonorecord can comprise a metal substrate and a conformal coating disposed on at least a portion of the metal substrate. In an embodiment, the phonorecord can embody a negative of an audio recording. The metal substrate can be made from a variety of metals including, silver, gold, nickel, chromium, and the like. In an embodiment, the substrate can comprise a material selected from the group consisting of silver, gold, and nickel. In an embodiment, the substrate can consist of a material selected from the group consisting of silver, gold and nickel. In an embodiment the substrate and comprise or consist of nickel. In an embodiment, the metal substrate can comprise one or more ridges embodying a negative of an audio recording. In an embodiment the "father" plate phonorecord can be a negative of an original master lacquer. In an embodiment, the "father" plate phonorecord can be a negative of an original master lacquer such that the phonorecord can be used as a stamper to produce end-use consumer vinyl records. In an embodiment, the "father" plate phonorecord can comprise at least one ridge, the at least one ridge of the "father" plate phonorecord being a negative of the at least one groove of the master lacquer. In an embodiment, the phonorecord can be configured to withstand a vinyl stamping process, including imprinting a plurality of vinyl blanks using the phonorecord. In an embodiment, the metal substrate can be coated with the conformal coating in order to provide durability and wearability to the metal substrate such that the phonorecord can withstand a vinyl stamping process.

In an embodiment, the lacquer coating can be disposed onto at least a portion of at least one surface of a substrate. In an embodiment, the lacquer coating can be disposed onto a majority of at least one surface of a substrate. In an embodiment, the lacquer coating can be disposed over the entirety of at least one surface of the substrate. In an embodiment, the lacquer coating can be disposed over at least a portion of, a majority of, or the entirety of, each surface of the substrate. The lacquer coating can comprise one or more grooves embodying an audio recording. The lacquer coating can be made from a variety of materials into which grooves can be disposed including, but not limited to nitrocellulose, cellulose acetate, cochineal, shellac and combinations thereof. In an embodiment, the lacquer coating can comprise a nitrocellulose lacquer. In an embodiment, the lacquer coating can consist of a nitrocellulose lacquer. The lacquer can be made from other polymeric materials such as materials used in microelectronics processing, photolithographic materials, e.g., benzocyclobutene (BCB)-based polymers, and the like.

In an embodiment, the phonorecord can comprise a conformal coating. In an embodiment, the conformal coating can be disposed onto at least a portion of a lacquer coating. In an embodiment, the conformal coating can be disposed onto the entirety of a lacquer coating. In an embodiment, the conformal coating can be disposed onto at least a portion of a vinyl substrate. In an embodiment, the conformal coating can be disposed onto the entirety of the vinyl substrate. In an embodiment, the conformal coating can be disposed onto at least a portion of a metal substrate. In an embodiment the conformal coating can be disposed onto the entirety of a metal substrate.

The conformal coating can comprise or consist of a variety of materials including, but not limited to minerals such as quartz, topaz, corundum, sapphire, diamond, diamond-like carbon, and combinations thereof. The conformal coating can comprise or consist of minerals, gemstones, and/or birthstones, including, but not limited to, diamond, ruby, amethyst, aquamarine, garnet, emerald, tourmaline, topaz, peridot, tanzanite, zircon, turquoise, and the like. The conformal coating can be made from a material comprising or consisting of silica, alumina, sol-gels, calcogenides, parylene, fluoropolymers such as polytetrafluoroethylene (PTFE), and carbon-based materials such as diamond, carbonado, diamond-like carbon, amorphous carbon, graphene, graphite, carbon nanotubes, and the like, and combinations thereof. In an embodiment, the conformal coating can be made from a material comprising or consisting of quartz ($SiO_2$), sapphire ($Al_2O_3$), or diamond-like carbon (DLC), and combinations thereof. In an embodiment, the material can comprise quartz. In an embodiment, the material can consist of quartz. In an embodiment, the material can comprise sapphire. In an embodiment, the material can consist of sapphire. In an embodiment, the material can comprise diamond-like carbon. In an embodiment, the material can consist of diamond-like carbon. In an embodiment, the conformal coating can comprise or consist of quartz, sapphire, diamond-like carbon, or combinations thereof.

In an embodiment, the conformal coating can be configured to provide increased durability, wearability, and/or lubricity to a substrate or coating. The substrate can comprise or consist of a variety of materials including, but not limited to, a vinyl substrate, a carbon-based substrate, or a metal substrate. In an embodiment, the conformal coating can be configured to provide increased durability, wearability, and/or lubricity to the lacquer coating. In an embodiment, the conformal coating can be made from a harder material than the lacquer coating. In an embodiment, the conformal coating can be configured to provide increased durability, wearability, and/or lubricity to the vinyl substrate. In an embodiment, the conformal coating can be made from a harder material than the vinyl substrate. In an embodiment, the conformal coating can be configured to provide increased durability, wearability, and/or lubricity to the metal substrate. In an embodiment, the conformal coating can be made from a harder material than the metal substrate.

In an embodiment, the Mohs Hardness of the conformal coating can be greater than the Mohs Hardness of the lacquer coating. In an embodiment, the Mohs Hardness of the conformal coating can be greater than the Mohs Hardness of the vinyl substrate. A person of ordinary skill in the art would know that the Mohs scale is a qualitative ordinal scale that characterizes the scratch resistance of various minerals and materials through the ability of a harder material to scratch a softer material. A person of ordinary skill in the art would know that various minerals are assigned various hardness values on the Mohs scale. In an embodiment, the conformal coating can have a Mohs Hardness of at least about 6. In an embodiment, the conformal coating can have a Mohs Hardness of at least about 7. [In an embodiment, the conformal coating can have a Mohs Hardness from about 7 to about 10. In an embodiment, the conformal coating can have a Mohs Hardness of about 7. In an embodiment, the conformal coating can have a Mohs Hardness of about 8. In an embodiment, the conformal coating can have a Mohs Hardness of about 9. In an embodiment, the conformal coating can have a Mohs Hardness of about 10.

A person of ordinary skill in the art would recognize that the hardness of materials can also be quantified by the Vickers hardness test. The Vickers test is performed to observe a material's ability to resist plastic deformation for a standard source. The Vickers test can be used for a variety of materials, including all metals, and the unit of hardness is known as the Vickers Pyramid Number (HV) or Diamond Pyramid Hardness (DPH). In an embodiment, the Vickers Hardness of the conformal coating can be greater than the Vickers Hardness of the lacquer coating. In an embodiment, the Vickers Hardness of the conformal coating can be greater than the Vickers Hardness of the vinyl substrate. In an embodiment, the Vickers Hardness of the conformal coating can be at least about 1000 HV. In an embodiment, the Vickers Hardness of the conformal coating can be from about 1000 HV to about 10000 HV. In an embodiment, the Vickers Hardness of the conformal coating can be about 1000 HV. In an embodiment, the Vickers Hardness of the conformal coating can be about 2000 HV. In an embodiment, the Vickers Hardness of the conformal coating can be about 1940 HV on the parallel axis and about 2200 HV on the perpendicular axis. In an embodiment, the Vickers Hardness of the conformal coating can be from about 2000 HV to about 4000 HV. In an embodiment, the Vickers Hardness of the conformal coating can be from about 2000 HV to about 10,000 HV. In an embodiment, the Vickers Hardness of the conformal coating can be about 10,000 HV. In an embodiment, the thickness of the conformal coating can be from about 10 nm to about 500 nm. In an embodiment, the thickness of the conformal coating can be from about 10 to about 200 nm. In an embodiment, the thickness of the conformal coating can be from about 100 nm to about 150 nm. In an embodiment, the thickness of the conformal coating can be from about 100 nm to about 200 nm. In an embodiment, the thickness of the conformal coating can be about 150 nm.

In an embodiment, the conformal coating can be intimately associated with a substrate or coating onto which it is disposed such that the conformal coating can comprise one or more grooves that are substantially identical to the one or more grooves of the substrate or coating onto which it is disposed. In an embodiment, the one or more grooves in the lacquer coating can form a lacquer coating topography. The lacquer coating topography can be the three-dimensional surface features and contours of the lacquer coating. In an embodiment, the one or more grooves that can be disposed into the lacquer coating create the lacquer coating topography. In an embodiment, the conformal coating can have a conformal coating topography. The conformal coating topography can be the three-dimensional surface features and contours of the conformal coating. In an embodiment, the conformal coating can be disposed onto at least a portion of the lacquer coating such that the conformal coating topography can be substantially identical to the lacquer coating topography. In an embodiment, the conformal coating can comprise substantially identical grooves as the lacquer coating such that the conformal coating embodies the substantially identical audio recording as the lacquer coating. In an embodiment, the conformal coating can be intimately associated with the lacquer coating such that the conformal coating comprises substantially identical grooves to the lacquer coating. In an embodiment, the conformal coating can comprise one or more grooves. In an embodiment, the one or more grooves in the conformal coating can be substantially identical to the one or more grooves disposed in the lacquer coating.

In an embodiment, the one or more grooves in a substrate can form a substrate topography. The substrate topography can be the three-dimensional surface features and contours of the substrate. In an embodiment, the one or more grooves that are disposed into the substrate create the substrate topography. In an embodiment, the conformal coating can have a conformal coating topography. The conformal coating topography can be the three-dimensional surface features and contours of the conformal coating. In an embodiment, the conformal coating can be disposed onto at least a portion of the substrate such that the conformal coating topography can be substantially identical to the substrate topography. In an embodiment, the conformal coating can comprise substantially identical grooves as the substrate such that the conformal coating embodies the substantially identical audio recording as the substrate. In an embodiment, the conformal coating can be intimately associated with the substrate such that the conformal coating comprises substantially identical grooves to the substrate. In an embodiment, the conformal coating can comprise one or more grooves. In an embodiment, the one or more grooves in the conformal coating can be substantially identical to the one or more grooves disposed in the substrate. The substrate can be any substrate, including, but not limited to, a vinyl substrate, or a metal substrate, or a carbon-based substrate.

In an embodiment, one or more ridges in a substrate (e.g., a substrate embodying a negative of a recording, can form a substrate topography). In an embodiment, the conformal coating can be disposed onto at least a portion of the substrate such that the conformal coating topography can be substantially identical to the substrate topography. In an embodiment, the conformal coating can be intimately associated with the substrate such that the conformal coating comprises substantially identical ridges to the substrate.

In an embodiment, the phonorecord can further comprise a conductive layer disposed onto at least a portion of the conformal coating. In an embodiment, a conductive layer can be disposed onto at least a portion of the lacquer coating. In an embodiment, a conductive layer can be disposed into at least a portion of a substrate, including, but not limited to a vinyl substrate or a metal substrate. A person of ordinary skill in the art would recognize that the grooves in the conformal coating, the lacquer coating, or the substrate can collect dust and/or other foreign particles that decrease the sound quality of the audio recording. The conductive layer can be configured to shed dust and/or other particles from an outer surface of the phonorecord. In an embodiment, the conductive layer can be configured to shed dust and/or other particles from at least a portion of the one or more grooves in the conformal coating. In an embodiment, the conductive layer can be configured to decrease or eliminate static charge in the vinyl substrate.

In an embodiment, the conductive layer can comprise a material selected from the group consisting of a carbon-based material and a metal. In an embodiment, the conductive layer can comprise a carbon-based material including, but not limited to carbon nanotubes, graphene, graphite, amorphous carbon, diamond-like carbon (DLC), diamond, and the like, and combinations thereof. In an embodiment, the conductive layer can comprise a graphene-based material. In an embodiment, the conductive layer can consist of a carbon-based material. In an embodiment, the conductive layer can be made from a metal including, but not limited to metal nanoparticles.

In an embodiment, the conformal coating and the conductive layer are the same layer and form a conformal-conductive layer. For example, in an embodiment, the conformal-conductive layer comprises a conductive material and thereby serves as both the conformal coating and the conductive layer. In an embodiment, the conformal-conductive layer can comprise or consist of graphene, thereby providing the durability and wear resistance of the conformal coating and the conductive properties and dust-particle shedding of the conductive layer. In an embodiment, the conformal-conductive layer can comprise or consist of metal nanoparticles. In an embodiment, the conformal-conductive layer can comprises or consist of a liquid dispersion of graphene. In an embodiment, the liquid conformal-conductive coating (e.g., liquid dispersion of graphene and/or nanoparticles) can be applied by a consumer to a phonorecord.

In an embodiment, the phonorecord can be configured to produce a plurality of playbacks of the audio recording on an audio playback device with minimal or no damage or degradation to the conformal coating. The conformal coating can be configured to allow a plurality of playbacks of the audio recording without decreasing the sound quality of the audio recording. In an embodiment, the conformal coating can be configured to allow a plurality of playbacks of the phonorecord on an audio playback device with minimal or no altering of the conformal coating topography or lacquer coating topography. In an embodiment, the phonorecord can be configured to allow a plurality of playbacks of the phonorecord on an audio playback device with minimal or no altering of the vinyl substrate topography. The conformal coating can produce a high degree of sound fidelity when played on a phonorecord device or audio playback device, such as a turntable, phonograph, and the like. Additionally the coated analog audio recording can be played a plurality of times without diminishing sound quality. Surprisingly, phonorecords comprising the conformal coating can have improved playback quality upon multiple playbacks on an audio playback device.

An embodiment of the invention can be a phonorecord for embodying an audio recording comprising a metal substrate and nitrocellulose lacquer. The nitrocellulose lacquer can further comprise a conductive dopant. The conductive dopant can comprise a carbon-based material as described above or a metal. In an embodiment, a conductive layer can be disposed onto at least a portion of the nitrocellulose lacquer.

In an embodiment, the phonorecord can further comprise an optical layer. The optical layer can be configured to store digital data. The optical layer can be made from any optical material that is capable of storing digital data, including, but not limited to, aluminum, and the like. In an embodiment, the optical layer can be disposed onto at least a portion of the lacquer coating. In an embodiment, the optical layer can be disposed onto the entirety of the lacquer coating. In an embodiment, the optical layer can be disposed onto at least a portion of the vinyl substrate. In an embodiment, the optical layer can be disposed onto the entirety of the vinyl substrate. In an embodiment, the vinyl substrate can be doped with the optical material such that the optical material is incorporated into, mixed, or within the vinyl substrate. The optical layer can be intimately associated with the vinyl substrate such that the optical layer has the same topography, or grooves, as the vinyl substrate. In an embodiment, the optical layer can be intimately associated with the lacquer coating such that the optical layer has the same topography, or grooves, as the lacquer coating. In an embodiment, the optical layer can comprise or consist of quantum dots that are disposed onto at least a portion of a lacquer coating or a substrate such as a vinyl, carbon-based, or metal substrate. In an embodiment, the quantum dots can be disposed onto the plateau, or flat portion between the one or more grooves of the lacquer coating or the substrate. In an embodiment wherein the quantum dots can store digital data, the presence of the dot can indicate a "1" whereas the absence of a dot can indicate a "0". Alternatively, the presence of the dot can indicate a "0" whereas the absence of a dot can indicate a "1". In an embodiment, the wavelength specific absorption of the quantum dot quantum dot (or any other type of material or physical structure with wavelength selective absorption or reflectance) can be used to indicate a 0 or 1 when interleaved with a reflective or absorptive surface. In addition, the wavelength selective absorbers and reflectors could be interleaved or vertical stacked to enable multi wavelength reading as well as higher density data storage.

An embodiment of the invention can be a stylus for playing back an audio recording embodied on a phonorecord. The stylus can produce superior sound reproduction, and decreased friction and abrasion on the phonorecord surface. The stylus can comprise a substrate and a conformal coating disposed onto at least a portion of the substrate. The substrate can be made from a variety of materials, including, but not limited to, carbon-based materials, metals, ceramics, diamond, sapphire, quartz and the like. In an embodiment, the stylus can comprise a nanowire substrate, similar to an atomic force microscopy tip. In an embodiment, the substrate can comprise a carbon-based material. In an embodiment, the carbon-based substrate can be selected from the group consisting of carbon nanotubes, graphene, and graphite. In an embodiment, the carbon-based material can be bundles of carbon nanotubes. The stylus can embody a variety of shapes such that the tip of the stylus "fits" into or conforms to the groove disposed into a phonorecord.

The conformal coating disposed on at least a portion of the stylus substrate can be made from materials as described above. In an embodiment, the conformal coating can comprise a material selected from the group consisting of quartz, sapphire, and diamond-like carbon. In an embodiment, the conformal coating can be made from quartz, sapphire, diamond-like carbon, or combinations thereof. The conformal coating can have the properties as described above including. In an embodiment, the conformal coating can have a Mohs Hardness of at least about 7. In an embodiment, the conformal coating can have a Vickers Hardness of at least about 1000. The conformal coating can have the dimensions as described above. In an embodiment, the thickness of the conformal coating can be from about 100 nm to about 150 nm.

In an embodiment, the stylus can comprise a sapphire substrate and a diamond-like-carbon conformal coating. In an embodiment, the stylus can comprise a diamond substrate and a sapphire conformal coating. In an embodiment, the stylus can comprise a diamond substrate and a quartz conformal coating. In an embodiment, the stylus can comprise a sapphire substrate and a quartz conformal coating.

The phonorecords and stylus described herein can be manufactured using the methods of this disclosure. A method for producing a phonorecord for embodying an audio recording can comprise providing a substrate, introducing one or more grooves embodying an audio recording into the substrate, and disposing a conformal coating onto at least a portion of the substrate. The substrate can be made from a variety of materials including, but not limited to vinyl, metal, or a carbon-based material.

In an embodiment, a method for producing a phonorecord for embodying an audio recording can comprise providing a substrate disposing a lacquer coating onto at least a portion of at least one surface of the substrate; introducing one or more grooves into the lacquer coating, the one or more grooves embodying the audio recording; and disposing a conformal coating onto at least a portion of the lacquer coating.

In an embodiment, a method for manufacturing an end-use consumer phonorecord can comprise providing a vinyl substrate, introducing one or more grooves into the vinyl substrate, and disposing a conformal coating onto at least a portion of the vinyl substrate.

Embodiments of the invention can include methods of manufacturing a stylus for playing back an audio recording as described herein. A method of manufacturing the stylus can comprise providing a substrate and disposing a conformal coating onto a least a portion of the substrate. An embodiment can comprise growing aligned carbon-nanotubes to form a stylus substrate. An embodiment can comprise gem cutting to form a stylus substrate. An embodiment can comprise nanowire growth to form a stylus substrate.

The one or more grooves can be introduced into the lacquer coating by various methods include, but not limited to diamond scribe, and the like. The one or more grooves can be introduced into the vinyl substrate by various methods including, but not limited to stamping a press plate into molten, or heated, vinyl, and the like. The one or more grooves can be introduced into a metal substrate, e.g., a "father" plate substrate, by electroplating a master lacquer and peeling the plated metal from the master lacquer, thereby forming a negative of the master lacquer.

The conformal coating can be disposed onto at least a portion of the lacquer coating, vinyl substrate, or stylus substrate using various methods including, but not limited to, physical vapor deposition techniques, chemical vapor deposition techniques, chemical techniques, electrochemical techniques, spraying, roll-to-roll coating, and the like. The conformal coating can be disposed onto at least a portion of the substrate using ion assisted deposition (IAD), atomic layer deposition (ALD), and plasma enhanced chemical vapor deposition (PECVD), sputtering, thermal evaporation, electron-beam evaporation, plasma spraying, and the like. The conformal coating can also be disposed onto the substrate via spin coating, dip coating, and the like. In an embodiment, the disposing the conformal coating can comprise ion assisted deposition. In an embodiment, the disposing the conformal coating can comprise atomic layer deposition.

In an embodiment, the disposing the conformal coating can be performed at a temperature less than the degradation temperature of nitrocellulose. In an embodiment, the disposing the conformal coating can be performed at a temperature of less than about 100° C. In an embodiment, the disposing the conformal coating can be performed at a temperature of about 100° C. In an embodiment, the disposing the conformal coating can be performed at a temperature from about 50° C. to about 150° C. In an embodiment, the disposing the conformal coating can be performed at a temperature from about 50° C. to about 200° C.

The methods of producing the phonorecord can further comprise disposing an optical layer onto at least a portion of a substrate or coating. In an embodiment, an optical layer can be disposed onto at least a portion of a lacquer coating. In an embodiment, an optical layer can be disposed onto at least a portion of a substrate, including a vinyl substrate, a carbon-based substrate, and/or a metal substrate. In an embodiment, the optical layer can be disposed onto at least a portion of the conformal coating. In an embodiment, the optical layer can be disposed into a vinyl substrate by doping the vinyl substrate with the optical material such that the optical material is incorporated into, mixed, or within the vinyl substrate. In an embodiment, the optical layer can be disposed by additively printing quantum dots onto at least a portion of the lacquer coating and/or vinyl, metal, or carbon-based substrate. The quantum dots can be disposed on the flat portion—or "plateau"—of the lacquer or substrate (e.g., between the one or more grooves, or between the V-shaped one or more grooves).

An embodiment of the invention can be production of the conformal coated master lacquer using the techniques described herein, followed by production of a negative "father" plate via methods such as electroplating, and the like, followed by production of the conformal coated negative "father" plate using the techniques described herein. The conformal coated negative "father" plate can be used as a stamper in order to produce end-use consumer records, e.g., vinyl records. The end-use consumer records can be coated with the conformal layer to produce a conformal coated end-use consumer phonorecord using the techniques described herein. An embodiment of the invention decreases the number of generations from lathe-cut master to end-use consumer phonorecord as compared to known methods. An embodiment of the invention increases the sound and data reproduction quality as compared to known methods.

Figure 2:
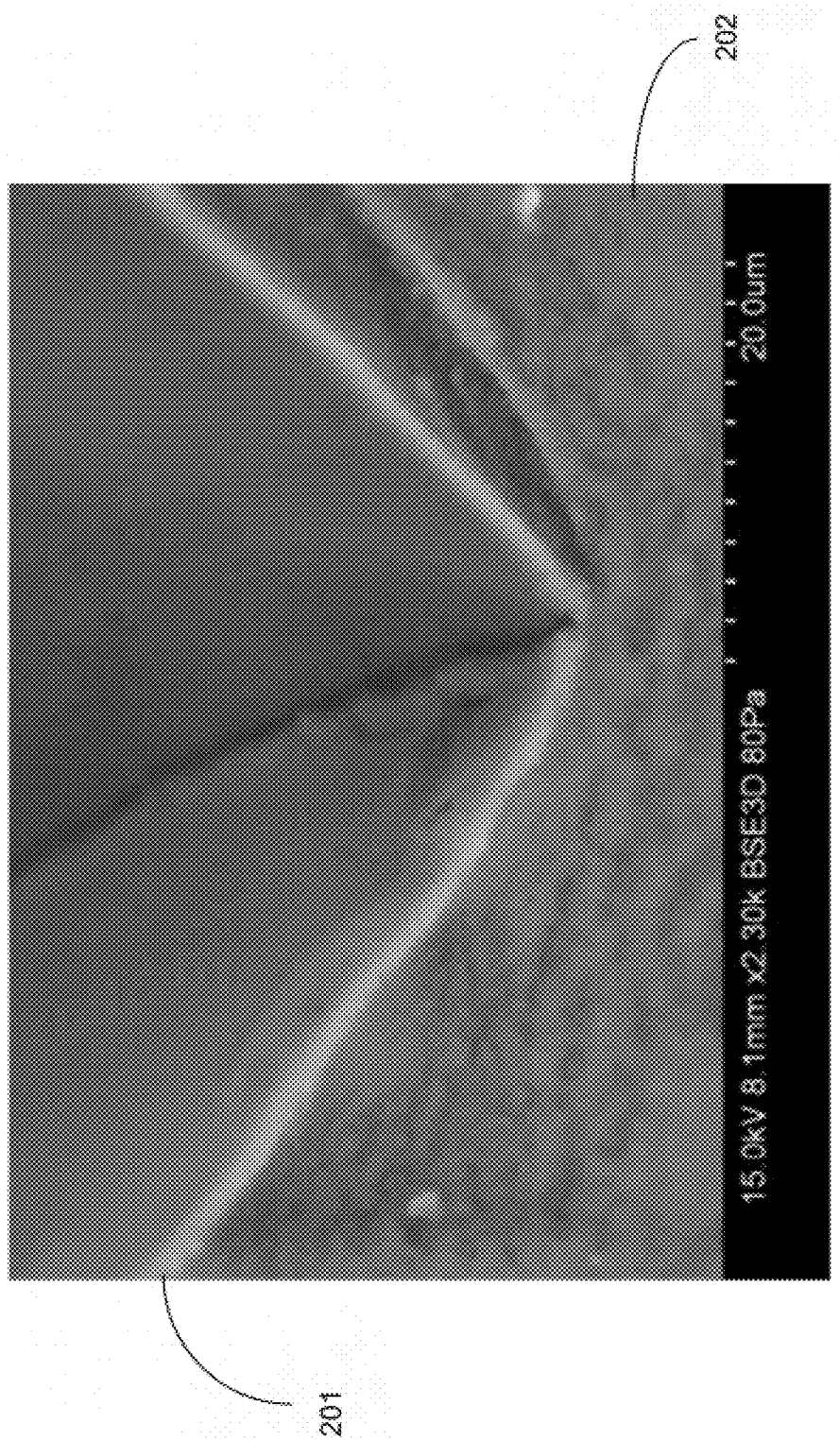
FIG. 2 illustrates an SEM image of one of the grooves in a nitrocellulose lacquer phonorecord after deposition of a 150 nm quartz ($SiO_2$) coating, in accordance with an embodiment of the invention.
Figure 3:
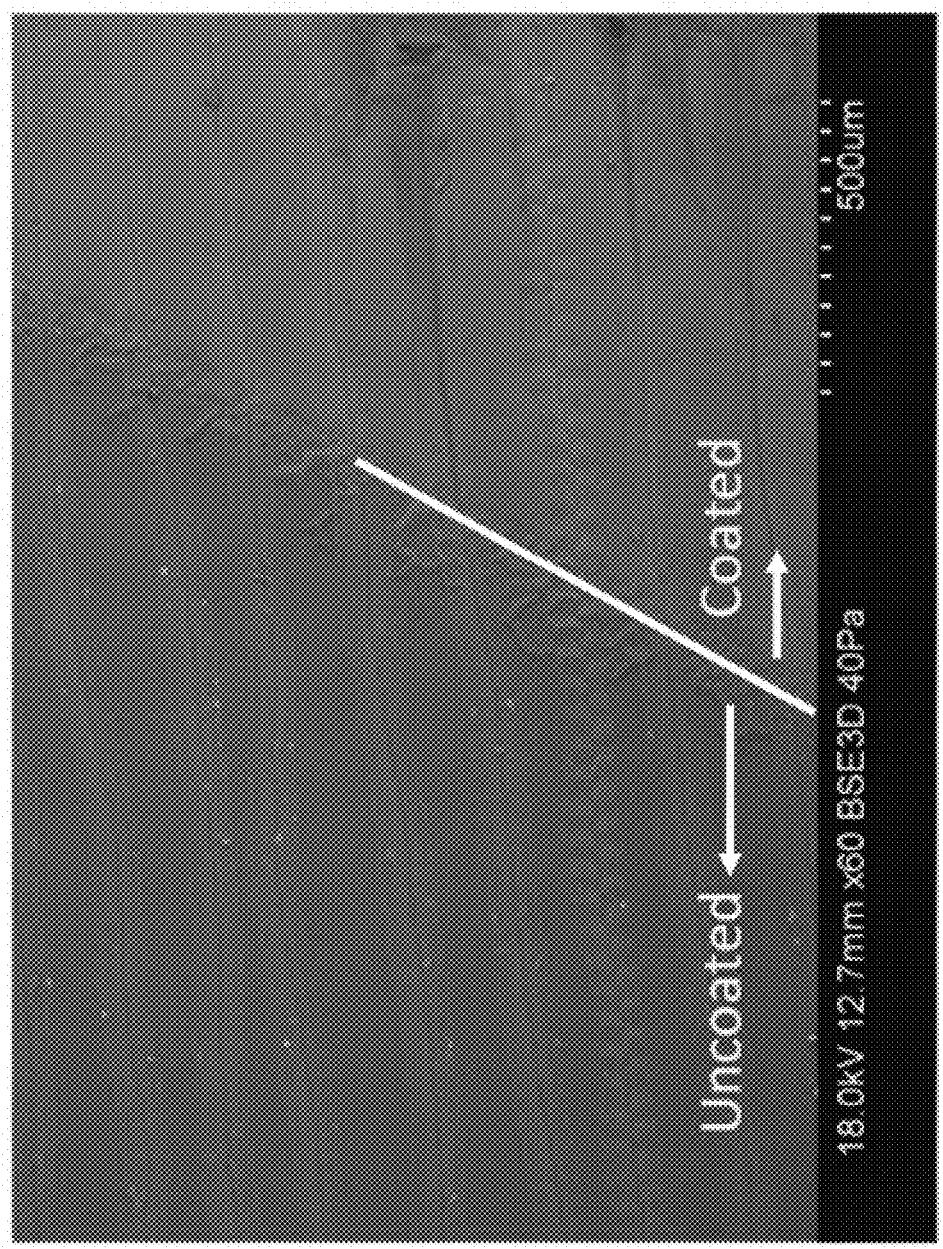
FIG. 3 illustrates an SEM image of a nitrocellulose surface which has been partially deposited with a sapphire ($Al_2O_3$) coating, in accordance with an embodiment of the invention.
Figure 4:
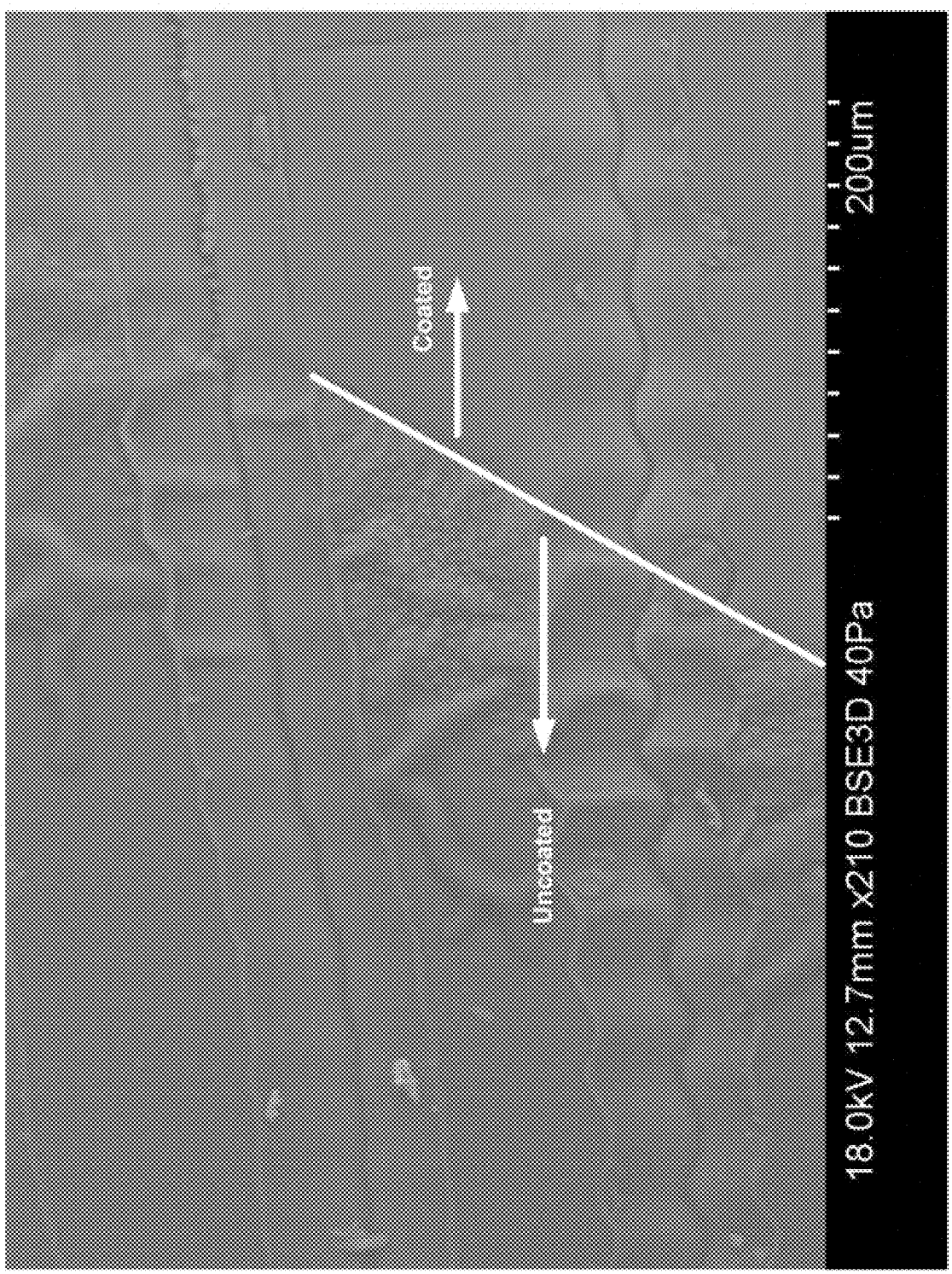
FIG. 4 illustrates an SEM image of a nitrocellulose surface which has been partially deposited with a sapphire ($Al_2O_3$) coating, in accordance with an embodiment of the invention.
Figure 5:
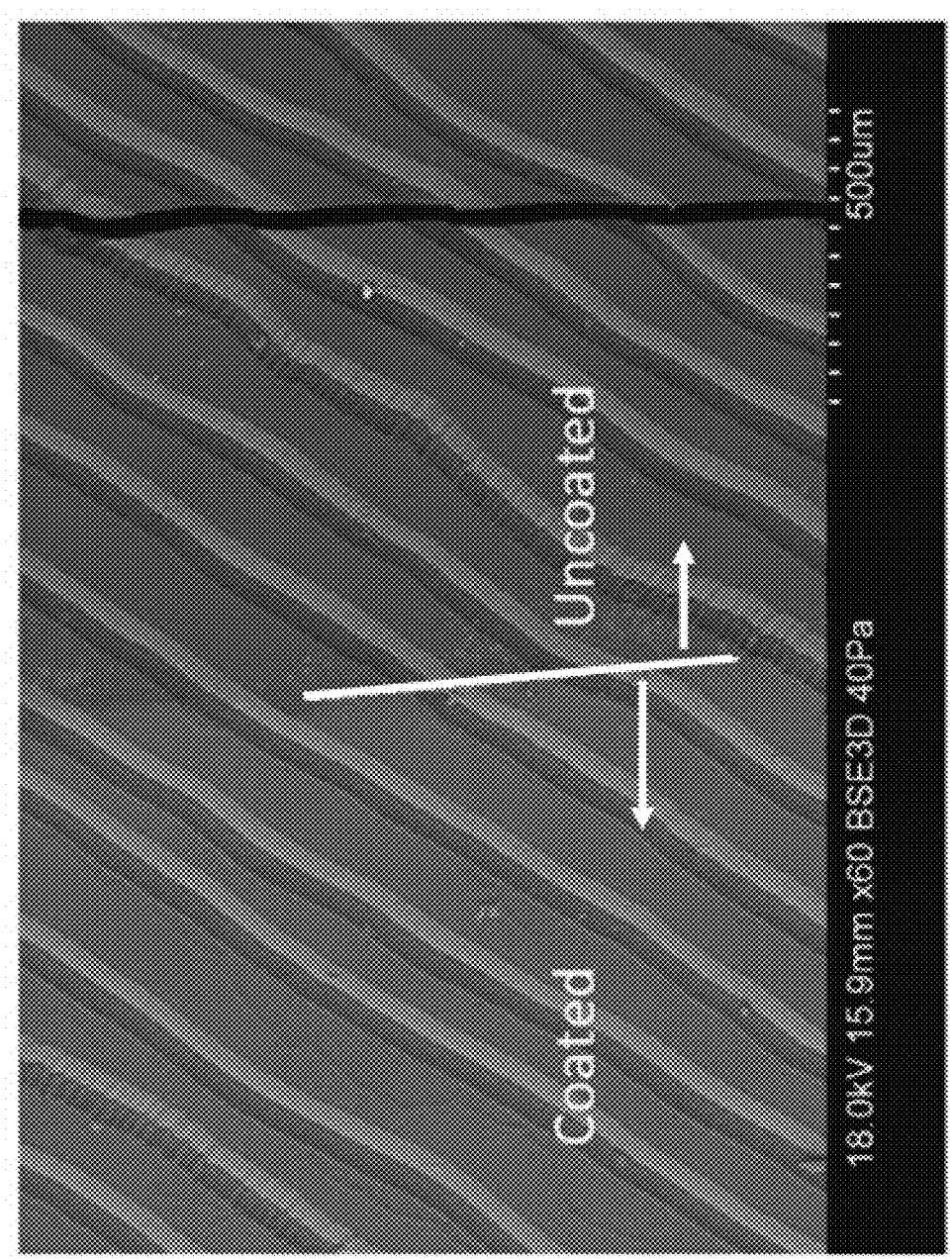
FIG. 5 illustrates an SEM image of a nitrocellulose surface which has been partially deposited with a sapphire ($Al_2O_3$) coating, in accordance with an embodiment of the invention.
Figure 6:
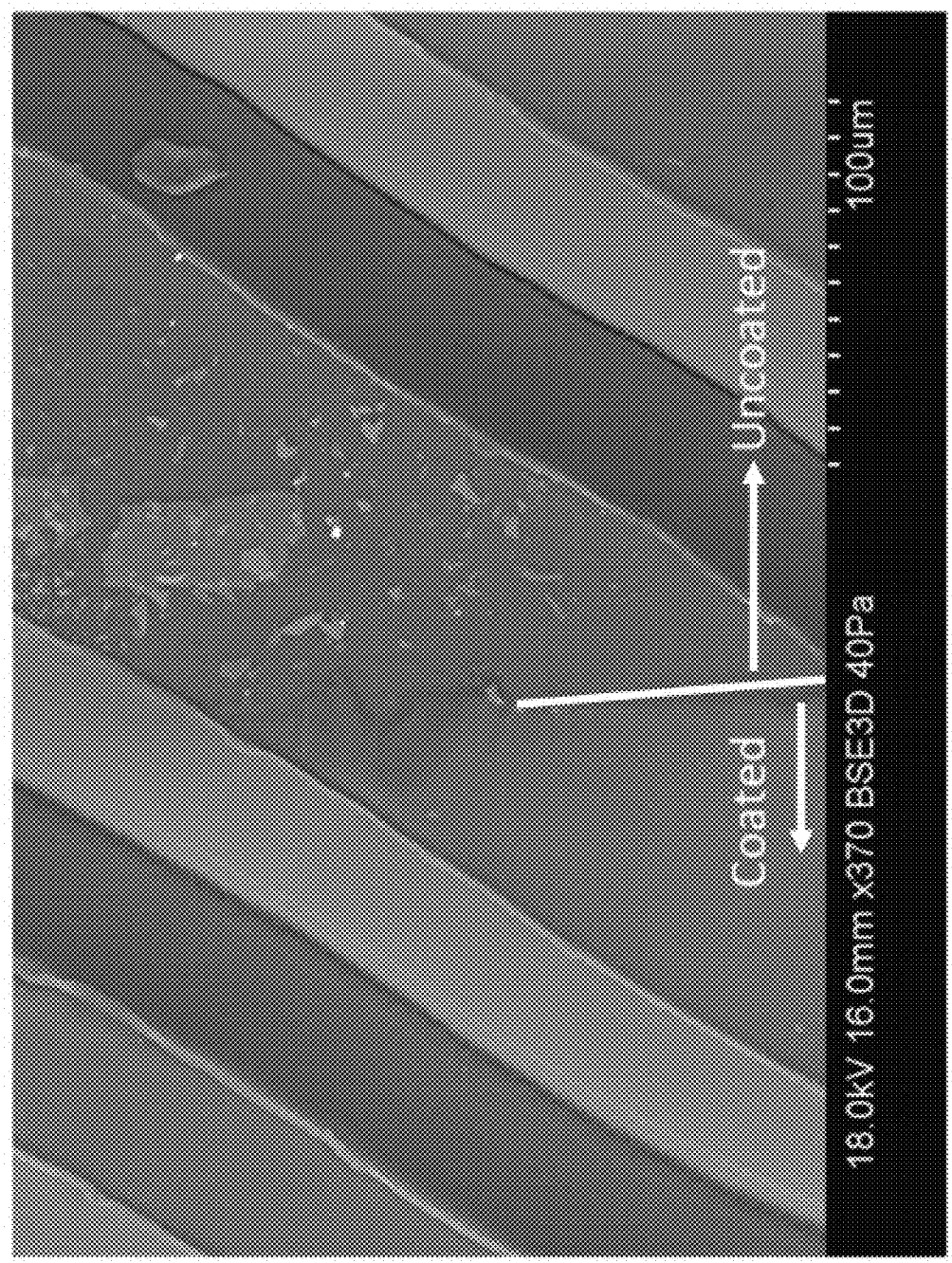
FIG. 6 illustrates an SEM image of a nitrocellulose surface which has been partially deposited with a sapphire ($Al_2O_3$) coating, in accordance with an embodiment of the invention.
Figure 7:
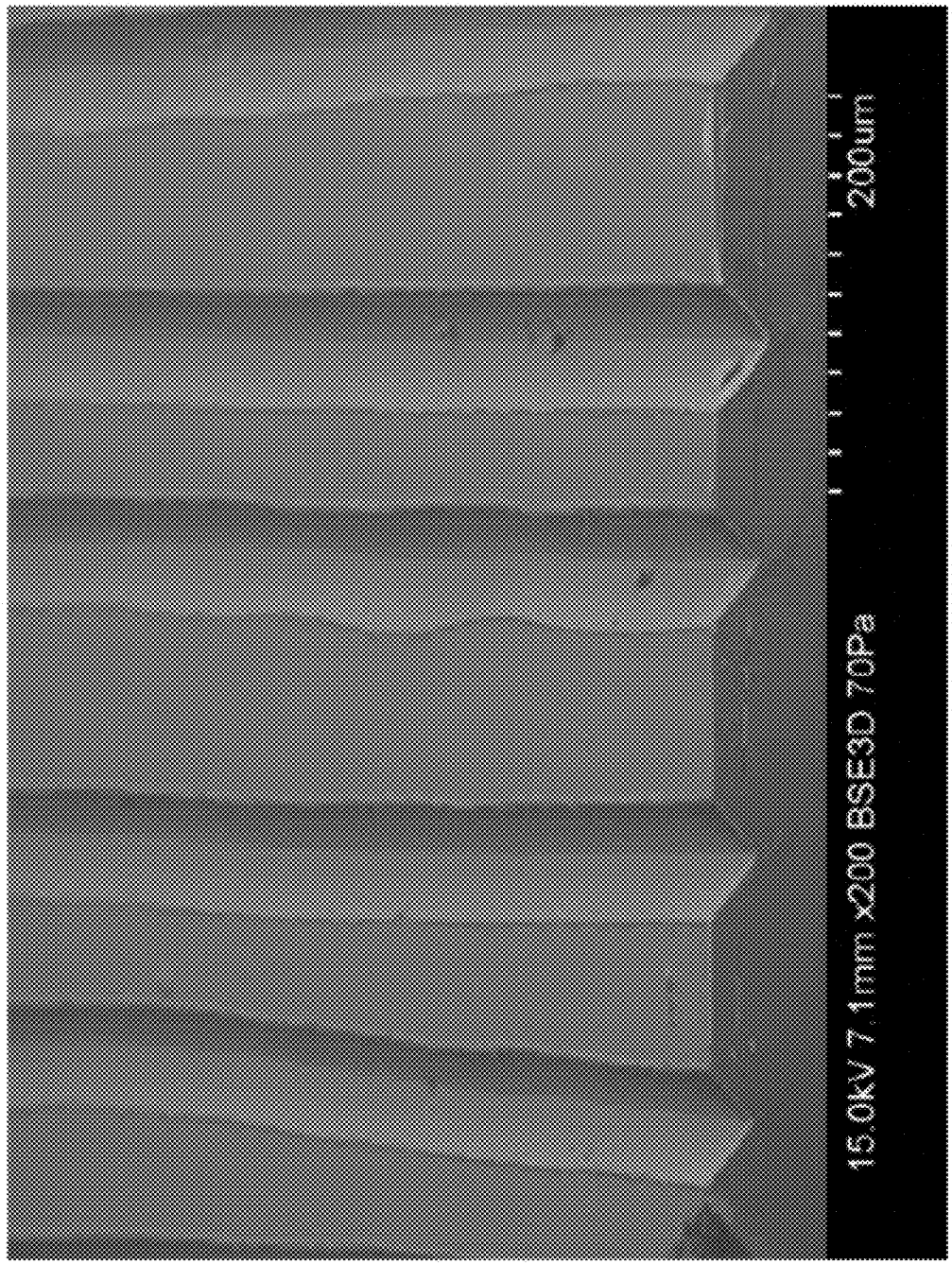
FIG. 7 illustrates an SEM image of a surface which has been partially deposited with a Titanium coating, in accordance with an embodiment of the invention.

Turning to the figures, FIG. 2 shows an SEM image of one of the grooves in a nitrocellulose lacquer 202 phonorecord after deposition of a 150 nm quartz ($SiO_2$) coating 201, in accordance with an embodiment of the invention.

Figure 8:
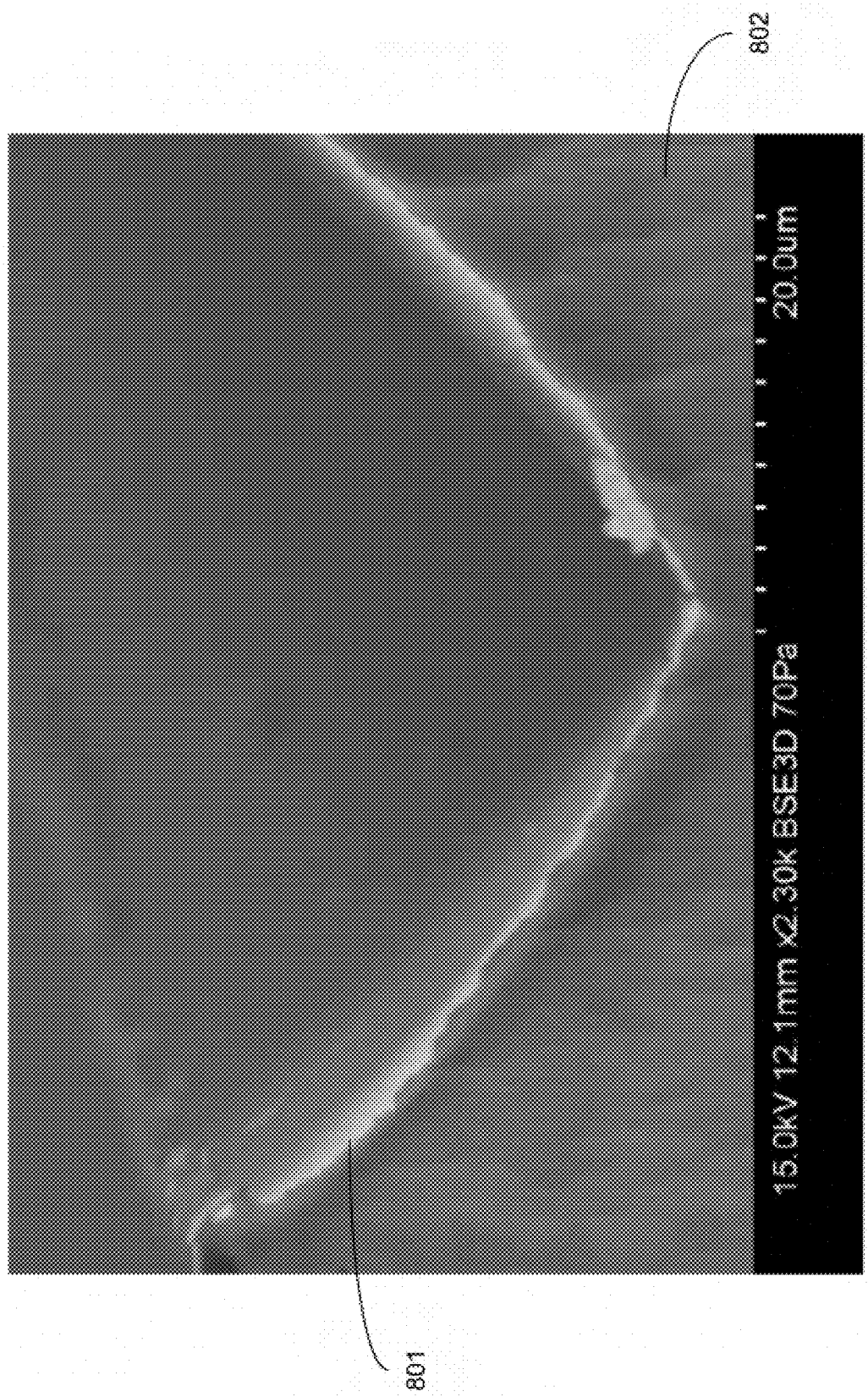
FIG. 8 illustrates an SEM image of a surface which has been partially deposited with a $TiO_2$ coating, in accordance with an embodiment of the invention.
Figure 9:
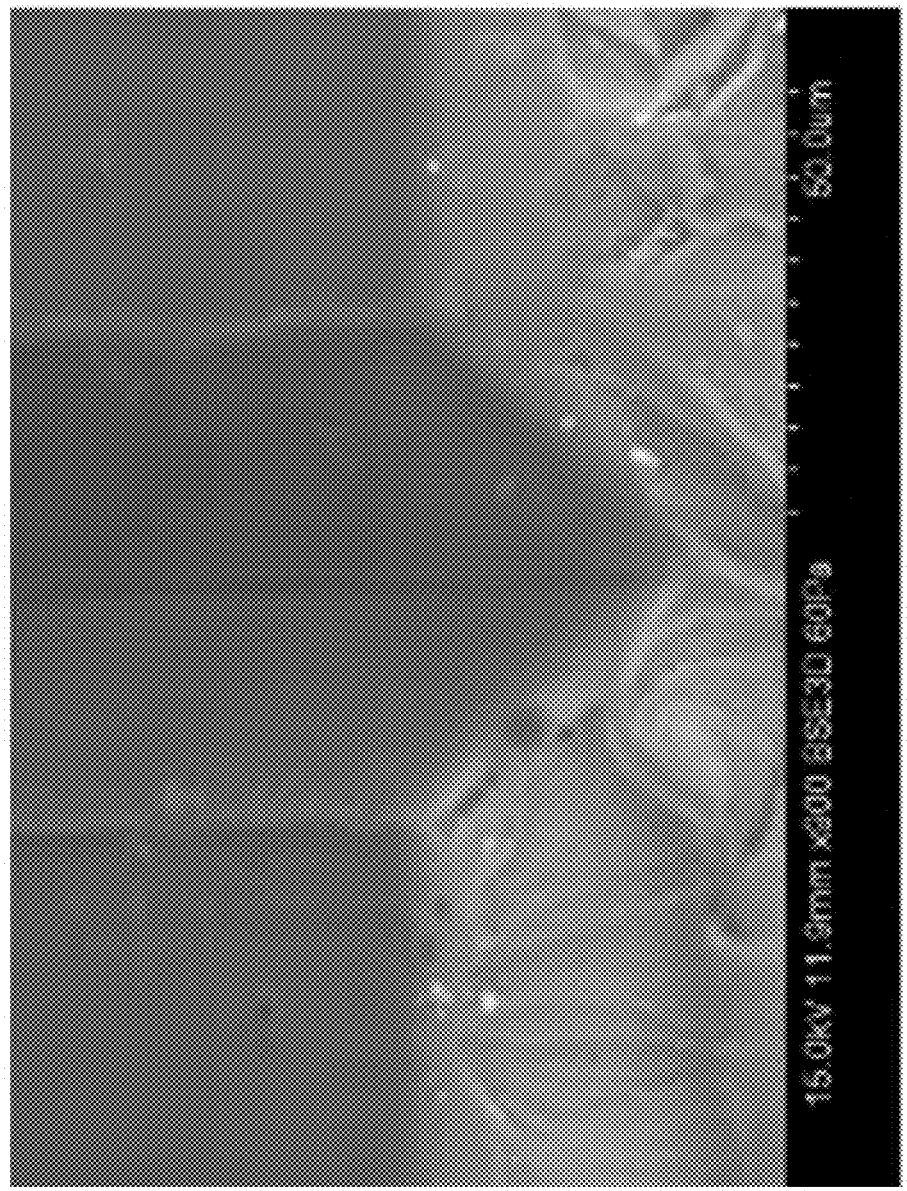
FIG. 9 illustrates an SEM image of a nitrocellulose lacquer containing audio grooves having no coating, in accordance with an embodiment of the invention.
Figure 10:
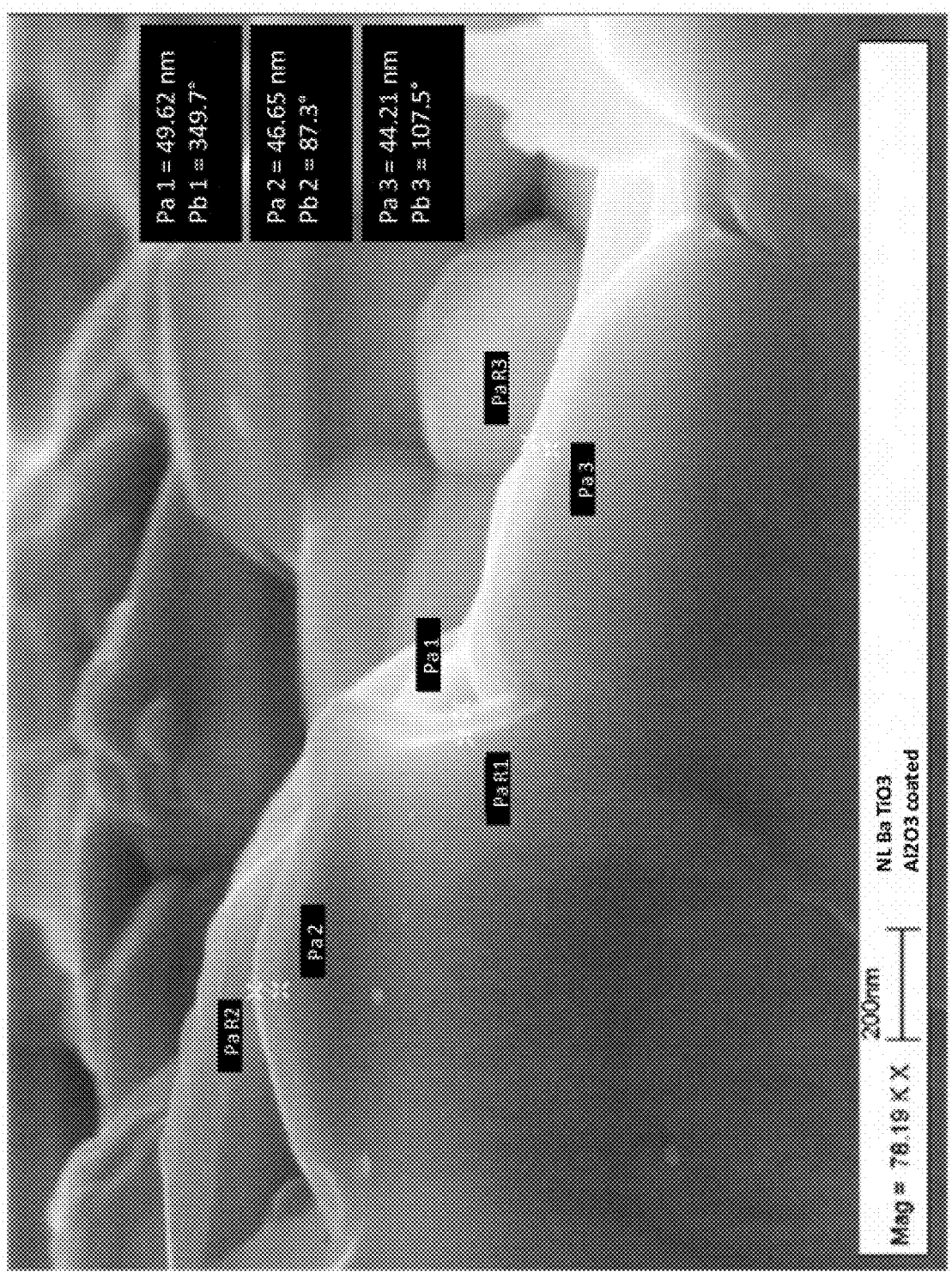
FIG. 10 illustrates an SEM image of nitrocellulose lacquer coated with nanoscale sapphire, in accordance with an embodiment of the invention.

FIG. 8 shows an SEM image of a lacquer coating surface 802 which has been partially deposited with a $TiO_2$ coating 801, in accordance with an embodiment of the invention.

Figure 11A:
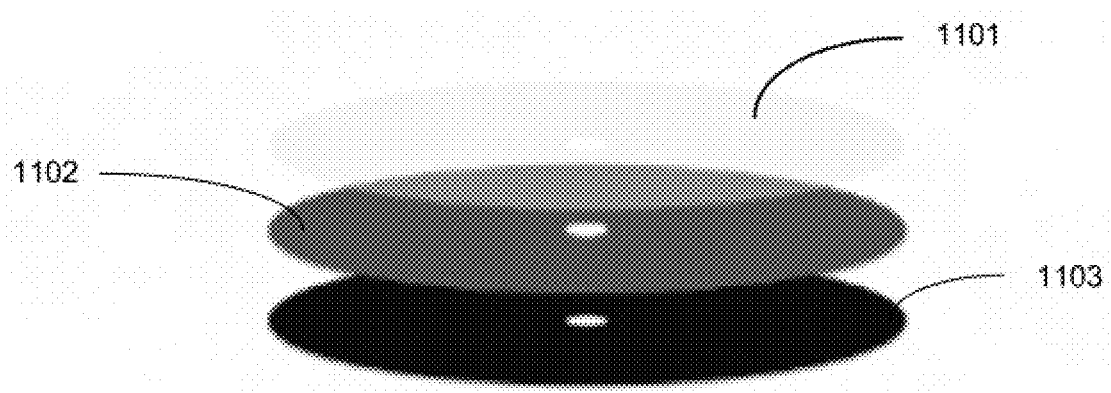
FIGS. 11a, 11b, and 11c each illustrate exemplary embodiments where the conformal coating is represented by the transparent disc, in accordance with an embodiment of the invention.
Figure 11B:
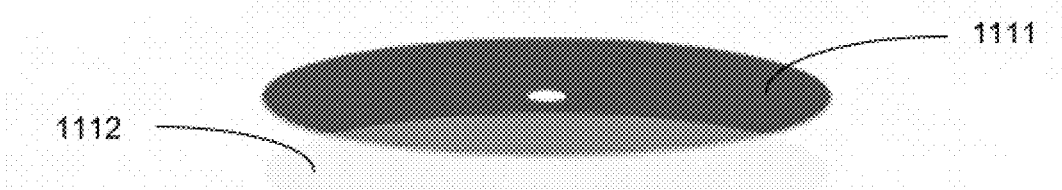
Figure 11C:
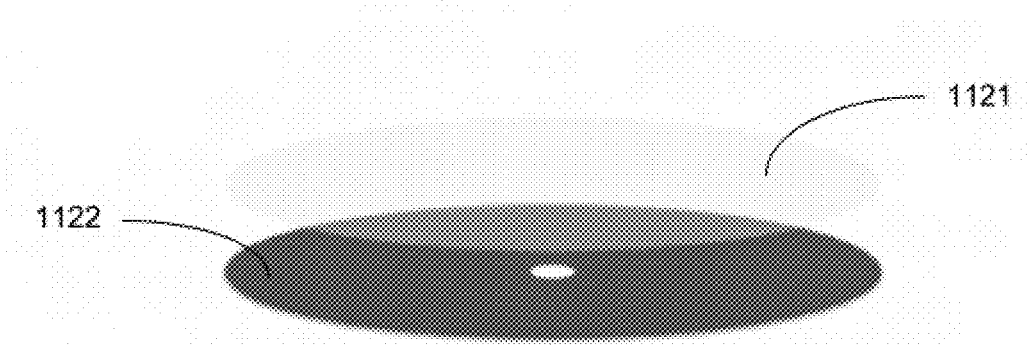

FIG. 11a represents a master lacquer according to an embodiment of the invention. FIG. 11a shows metal substrate 1103, lacquer coating 1102 and conformal coating 1101. FIG. 11b represents a "father" plate, or negative of the master lacquer that is shown in FIG. 11a. The "father" plate FIG. 11b can be used as a stamper. Substrate 1111 embodies a negative of an audio recording. Substrate 1111 is coated with conformal coating 1112. FIG. 11c represents a consumer vinyl disc. Vinyl disc/substrate 1122 is coated with conformal coating 1121.

Figure 12:
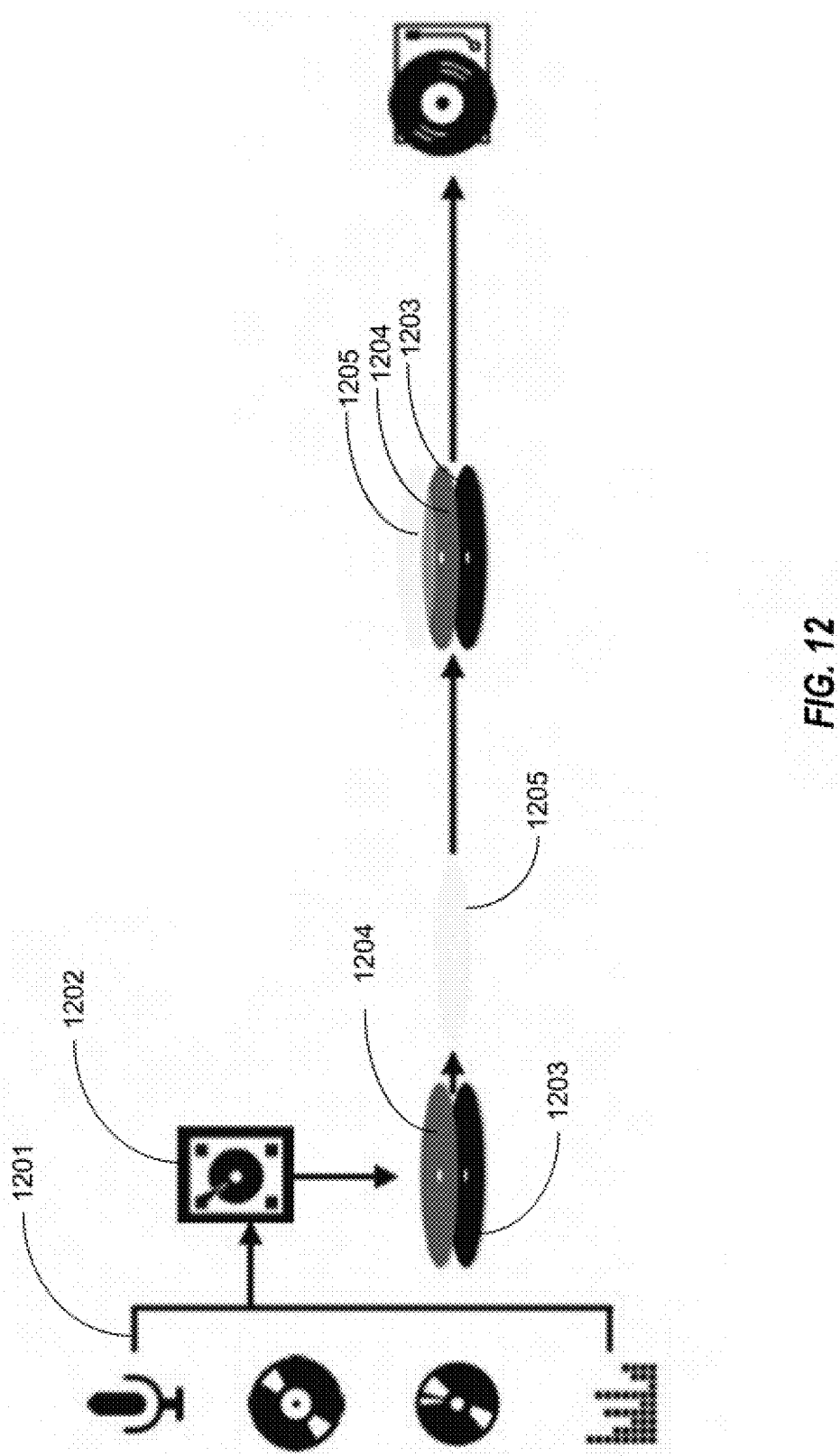
FIG. 12 illustrates an embodiment wherein the nitrocellulose master embodying an audio recording is coated with one or more conformal layers of material, in accordance with an embodiment of the invention.
Figure 13:
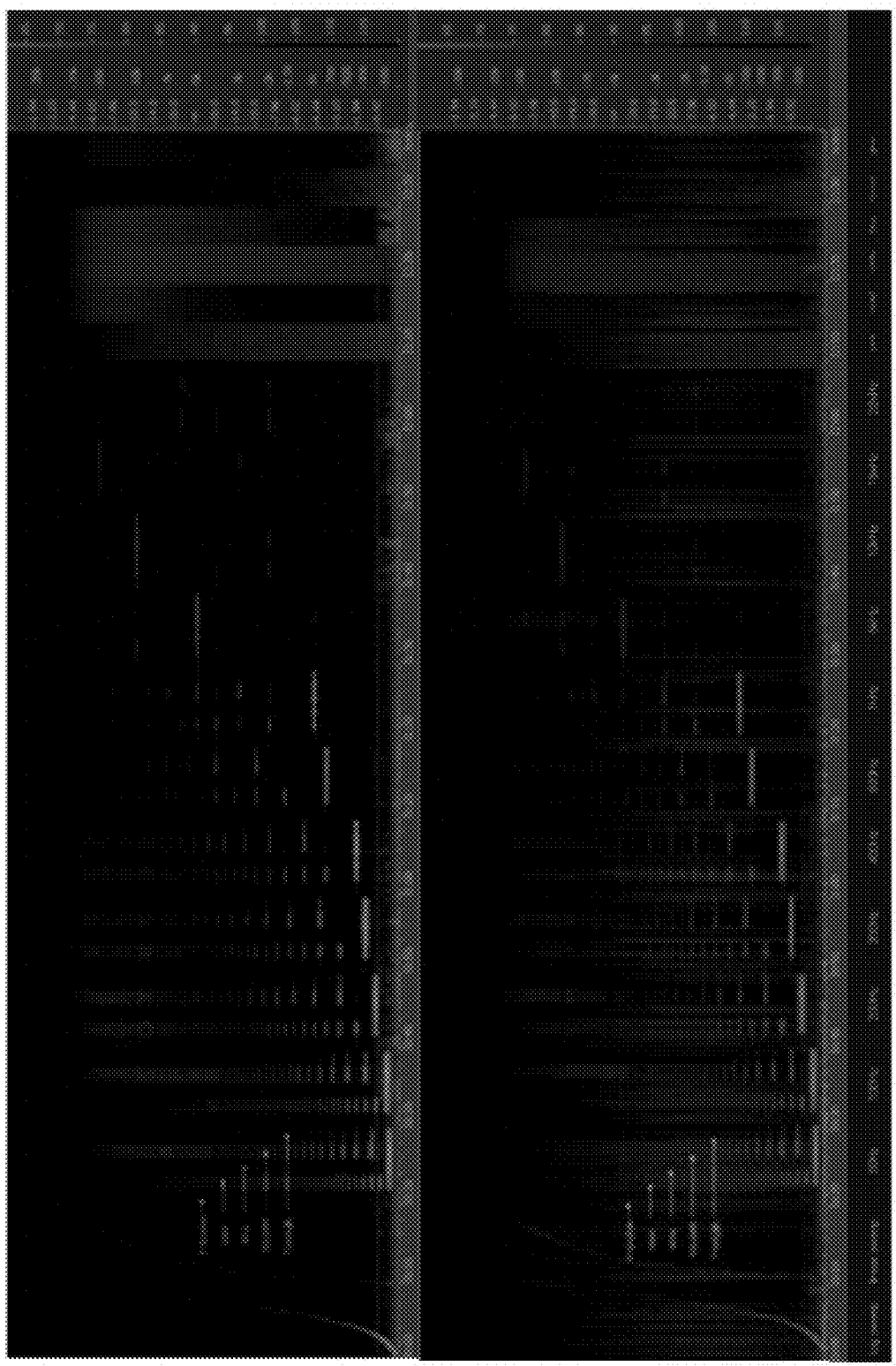
FIG. 13 illustrates the results of a sound spectrograph comparison of an uncoated vinyl record in accordance with an embodiment of the invention. The top and bottom represent the same disc measured over the same audio range. The top image displays the results after a single pass. The lower image displays the result after 203 passes.
Figure 14:
FIG. 14 illustrates the results of a sound spectrograph comparison of an embodiment in accordance with an embodiment of the invention. The top and bottom represent the same disc measured over the same audio range. The top image displays the results after a single pass. The lower image displays the result after 203 passes.
Figure 15:
FIG. 15 illustrates the results of a sound spectrograph comparison of an embodiment in accordance with an embodiment of the invention. The top and bottom represent the same disc measured over the same audio range, in accordance with an embodiment of the invention. The top image displays the results after a single pass. The lower image displays the result after 203 passes.
Figure 16A:
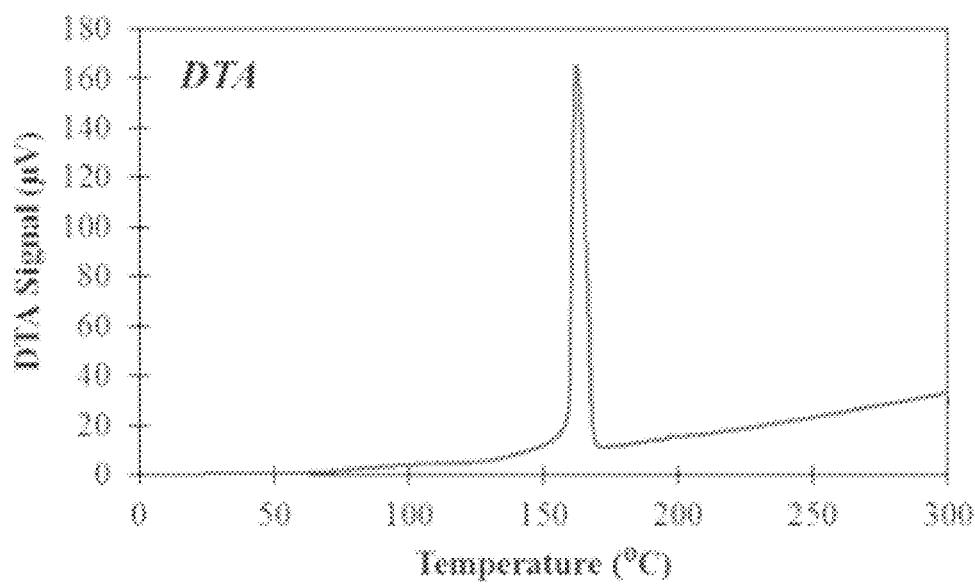
FIGS. 16a and 16b illustrate results from differential thermal analysis and thermogravimetric analysis of the nitrocellulose lacquer, in accordance with an embodiment of the invention.
Figure 16B:
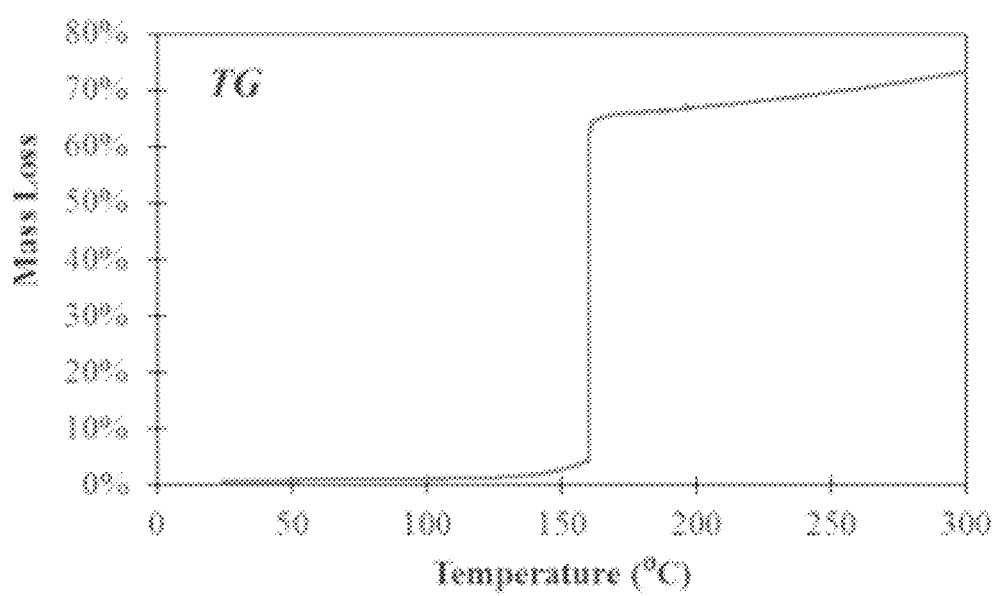

FIG. 12 shows a method of making a master lacquer that is capable of withstanding multiple playbacks on a playback device. Original data sources 1301, e.g., studio performances, original acetates, analog tapes, digital recordings, and the like can be embodied on a master lacquer comprising a substrate 1303, e.g., a metal substrate, and a lacquer coating 1304 via various methods, such as diamond scribing using a needle or stylus 1302. The master lacquer comprising the metal substrate 1303 and lacquer coating 1304 can be coated with conformal coating 1305 to produce a conformal coated master lacquer. The conformal coating 1305 can increase the durability and wearability of the master lacquer such that the conformal coated master lacquer can be played on an audio playback device, e.g., a turntable, for a plurality of playbacks with minimal or no damage or degradation to the conformal coating or to the one or more grooves embodying an audio recording that are disposed onto the lacquer coating via a diamond scribe, and the like 1302.

It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

The invention claimed is:

1. A phonorecord for embodying an audio recording comprising:
   a. a metal substrate;
   b. a lacquer coating disposed on at least a portion of the metal substrate, the lacquer coating comprising;
      a nitrocellulose lacquer; and
      one or more grooves embodying the audio recording; and
   c. a conformal coating disposed on at least a portion of the lacquer coating;
   wherein the conformal coating is made from a material comprising one or more of quartz ($SiO_2$), sapphire ($Al_2O_3$), or diamond-like carbon (DLC).

2. The phonorecord of claim 1, wherein a Mohs Hardness of the conformal coating is greater than a Mohs Hardness of the lacquer coating.

3. The phonorecord of claim 1, wherein a thickness of the conformal coating is from about 10 nm to about 500 nm.

4. The phonorecord of claim 1, further comprising a conductive layer disposed onto at least a portion of the conformal coating, the conductive layer configured to shed dust from an outer surface of the phonorecord; and
   wherein the conductive layer comprises a carbon-based material selected from the group consisting of carbon nanotubes, graphene, and graphite.

5. The phonorecord of claim 1, wherein the one or more grooves form a lacquer coating topography.

6. The phonorecord of claim 5, wherein the conformal coating has a conformal coating topography, the conformal coating topography being substantially identical to the lacquer coating topography.

7. The phonorecord of claim 1, further comprising an optical layer disposed onto at least a portion of the lacquer coating, the optical layer storing digital data.

\* \* \* \* \*